United States Patent
Yang (10) Patent No.: US 7,483,820 B2
(45) Date of Patent: Jan. 27, 2009

(54) METHOD FOR RANKING WEBPAGES VIA CIRCUIT SIMULATION

(75) Inventor: Baolin Yang, Fremont, CA (US)

(73) Assignee: Gemini Design Technology, Inc., Fremont, CA (US)

(*) Notice: Subject to any disclaimer, the term of this patent is extended or adjusted under 35 U.S.C. 154(b) by 31 days.

(21) Appl. No.: 11/736,259

(22) Filed: Apr. 17, 2007

(65) Prior Publication Data

US 2007/0244884 A1    Oct. 18, 2007

Related U.S. Application Data

(63) Continuation-in-part of application No. 11/612,335, filed on Dec. 18, 2006.

(60) Provisional application No. 60/793,123, filed on Apr. 18, 2006.

(51) Int. Cl.
*G06F 9/455* (2006.01)

(52) U.S. Cl. ............................... 703/6; 707/1; 715/206; 705/10

(58) Field of Classification Search .................. 703/6, 703/2, 14; 707/1; 715/206; 705/10; 358/1.18; 716/4, 11
See application file for complete search history.

(56) References Cited

U.S. PATENT DOCUMENTS

| | | | | |
|---|---|---|---|---|
| 6,507,410 | B1* | 1/2003 | Robertson et al. | 358/1.18 |
| 6,530,065 | B1* | 3/2003 | McDonald et al. | 716/4 |
| 2003/0097246 | A1* | 5/2003 | Hara et al. | 703/14 |
| 2004/0176992 | A1* | 9/2004 | Santos et al. | 705/10 |
| 2004/0268283 | A1* | 12/2004 | Perry et al. | 716/11 |
| 2005/0028081 | A1* | 2/2005 | Arcuri et al. | 715/501.1 |
| 2006/0074843 | A1* | 4/2006 | Pereira | 707/1 |

* cited by examiner

*Primary Examiner*—Kandasamy Thangavelu
(74) *Attorney, Agent, or Firm*—Martine Penilla & Gencarella, LLP (57) ABSTRACT

In one embodiment, a method for ranking webpages is provided. The method includes generating a web circuit model having a node representing each webpage. The model is simulated to identify the potential at each node. The webpages can then be ranked according to the potentials of the nodes to which the webpages correspond.

29 Claims, 5 Drawing Sheets

METHOD FOR RANKING WEBPAGES VIA CIRCUIT SIMULATION

CLAIMS OF PRIORITY

This Application claims the benefit of U.S. Provisional Patent Application 60/793,123 entitled "Method For Ranking Websites Via Circuit Simulation," filed on Apr. 18, 2006, which is incorporated herein by reference.

This application is a continuation-in-part of U.S. patent application Ser. No. 11/612,335 entitled "Parallel Multi-Rate Circuit Simulation," filed Dec. 18, 2006, also incorporated herein by reference.

BACKGROUND

The number of websites on the web or Internet has grown to billions. Efficient ways to find the important websites and information on the web are becoming more and more important to users. Internet search engines including Google™, Ask.com™, Yahoo!™, and MSN™ use different methods to search the web efficiently. Web searching has become an important part in Internet users' everyday life. It has huge value in bringing information to people.

Various algorithmic web search techniques still have many shortcomings. Google Technology, Inc. uses the PageRank® and Hilltop methods in its search engine. The method ranks websites according to hyperlinks between websites. It uses the "power method" to find the eigenvector of the so-called teleportation matrix. The eigenvector gives the ranking of the websites. To ensure convergence, a teleportation parameter equal to 0.85 is used. It has been reported that the PageRank method gives different result when different teleportation parameters are used. Another algorithmic search method, the ExpertRank method used by Ask.com™, also solves an eigenvalue and eigenvector problem. The method does more than just identify pages with useful information about a topic, which is called "authorities." The method also looks for pages that contain many links to pages with useful information on the topic, which is called "hubs." The assumption behind this is that the most authoritative pages on a given subject will be those that are most often pointed to by other pages.

Existing algorithms are susceptible to link spam, wherein spam websites improve their ranking by creating a lot of links pointing to their websites. In addition, some existing algorithms penalize large web domains that have a large amount of interlinked websites.

It would be desirable to find websites with great content and websites with many weighted inbound links. It would furthermore be desirable to encourage webmasters to maintain their website and remove spam links.

SUMMARY

Broadly speaking, the present invention fills these needs by providing a method for ranking websites via a circuit simulation.

It should be appreciated that the present invention can be implemented in numerous ways, including as a process, an apparatus, a system, a device, or a method. Several inventive embodiments of the present invention are described below.

In one embodiment, a method for ranking websites is provided. The method includes generating a web circuit model having a node representing each website. The model is simulated to identify the potential at each node. The websites can then be ranked according to the potentials of the nodes to which the websites correspond. The web circuit model has an energy source configured to deliver energy into the web circuit. The energy source is connected to each of the nodes with a source connector having a selected resistance. In addition, each of the nodes are connected to an energy drain with a drain connection, the drain connection having a resistance relating to a content score of the website corresponding to the node as well as the number of inbound inlinks and voltage levels of the corresponding webpages providing the links. For each hyperlink connecting a first one of the websites to a second one of the websites, a diode-like device is added to the web circuit between a first one of the nodes and a second one of the nodes, the first one of the nodes corresponding to the first one of the websites and the second one of the nodes corresponding to the second one of the websites, the diode-like device allowing current to flow more easily from the first node to the second node than from the second node to the first node.

In another embodiment, a method of performing web search using a computer system, is provided. In the method, the websites on a network are identified. For each of the websites, a content score based on a content of the websites. An index of the websites is generated, the index being a computer searchable database indexed by words found in the websites. A web circuit model is generated, the web circuit model comprising a node representing each of the websites, an energy source, and a source connection corresponding to each node. Each source connection connects the energy source to one of the nodes, and each drain connection connects each node to ground. The source connections have a selected resistance, and the drain connection have a resistance relating to a content score of the website associated with the node as well as the number of inbound inlinks and voltage levels of the corresponding webpages providing the links. Each hyperlink connecting two of the websites is represented in the web circuit as a diode like device having a low resistance in a direction corresponding to a direction of the hyperlink and a high resistance in a direction opposite the direction corresponding to the direction of the hyperlink. The web circuit is then simulated using a computer to determine a potential at each of the nodes. The websites are ranked and sorted according to corresponding voltages of the corresponding nodes. A list of a subset of the websites is then produced, the subset including ones of the websites related to a query.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention. As used herein, the term, "webpage" refers to a document having an individual web address. The term, "website" refers to a collection of related webpages, such as web documents having a common root web address. The phrase, "the web" refers to all indexable websites and webpages accessible via the Internet.

Model the Web

The method described herein is essentially a nonlinear method for ranking webpages. By "nonlinear," it is meant that the system of equations describing webpages for the purpose of ranking is nonlinear. The use of nonlinear equations in the system allows one to model the web to more accurately rank webpages according to relevance. In one embodiment, the web is modeled as an integrated circuit, referred to herein as a "web circuit." In the web circuit, sophisticated controlling schemes for fighting spam can be designed using techniques in circuit design. The web circuit model also allows for flexible modification or tuning, either locally or globally, of the model to yield a desired result. Because the web circuit model described herein is physical, it always has a physical solution. This ranking method is also able to consider history and ensure smoothness in ranking variation, as will be described in further detail below.

Figure 1:
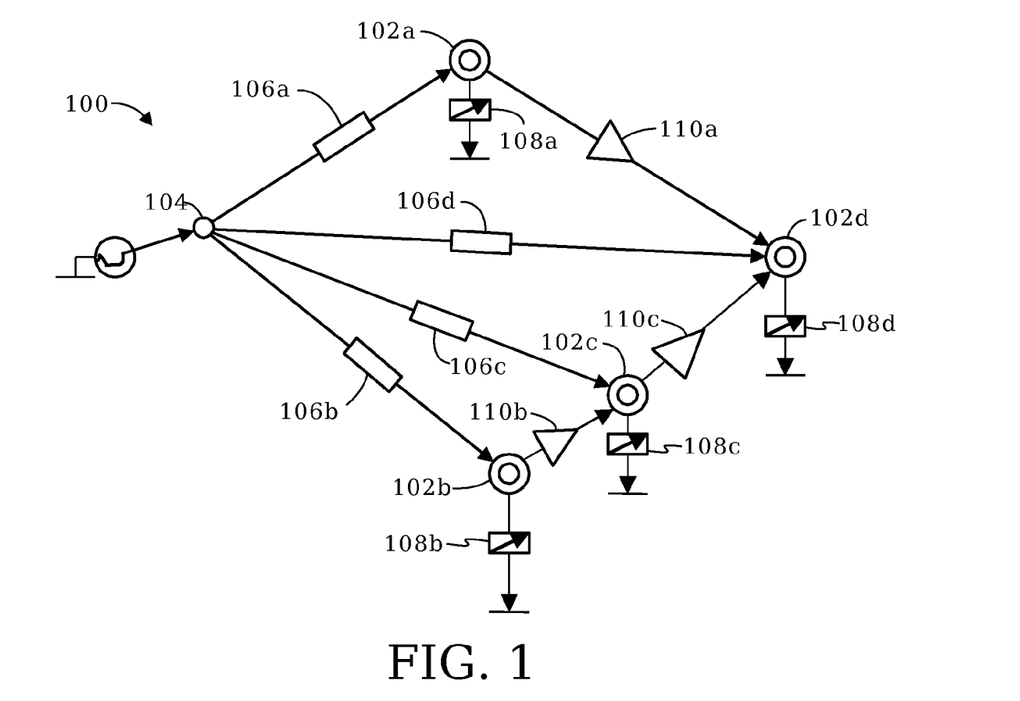
FIG. 1 shows by way of example, web circuit representing a plurality of websites.

FIG. 1 shows by way of example, web circuit 100 representing a plurality of webpages. Each webpage is represented as a node 102a-102d in web circuit 100. The web user is modeled as a voltage node 104. Voltage node 104 provides a source of energy to web circuit 100. In one embodiment, voltage node 104 has a fixed voltage, the potential of can be through of as representing the user's desire to surf the web. In another embodiment, the energy source has a fixed current. Other energy sources can be envisioned without impacting the usefulness of the model. A resistor 106a-106d links the user and each website he wants to go to. In one embodiment, each webpage represented as a node is retrieved from the list of webpages obtained from a search of a web index, as described in further detail below with reference to FIG. 4. The resistance of resistors 106a-106d can be thought of as representing the difficulty for the user to go to the website. The resistance of resistors 106a-106d may be fixed, i.e., uniform, for general search. For topic dependent searches, described in more detail below, the resistances can be topic dependent. For example, a user who is an engineer can have tight connection with all the engineering community or resource webpages, represented by lower resistances to nodes representing those webpages. A sophisticated and personalized model may therefore be designed by varying the resistance between the user and the webpages of interest to the user.

For instance, a tiny resistance may be placed between the user and an accredited directory website such as Yahoo.com. Therefore, the potential at these websites is very close to the source potential. Directory websites are generally authoritative websites that provide links to other high quality sites related to certain topics of information. Typically, users know these websites well and often go to these websites to find other websites. In practice, the potential (e.g., voltage) of webpages may be fixed for large directories to some approximate value that is close to the source potential. Essentially, this node can therefore be treated as an energy source during a simulation. This approximation can save simulation cost by reducing the complexity of the circuit. Because directory websites are authoritative, trusting these directories does not hurt the quality of ranking. In one embodiment, the quality of a directory website is determined subjectively.

A linear voltage controlled resistor 108a-108d links each node 102a-102d to ground in the web circuit model. The resistance value of linear voltage controlled resistors 108a-108d may be proportional to the controlling function, the total number of outbound hyperlinks, the content score (low score for web spam), and the weighted inbound links from other webpages to this webpage. A weighted inbound link is simply a link with some multiplication factor assigned to it based on various factors. For example, a hyperlink between two webpages, for example from webpage A to webpage B, may be weighted by several factors in converting to the resistance value:

1. a linear function of the controlling voltage $v(A, 0)$ where $v(A, 0)$ is the voltage difference between node A and ground,
2. inverse of total number of outbound links of webpage A if A is not part of a directory website,
3. a number proportional to the quality of a directory website, which can be measured by total number of links in the whole service, if A is a directory website,
4. inverse of average number of links per webpage in the domain of webpage A,
5. the content score of webpage A, and
6. the relevance score of the content associated with the link (content relevance of advertising link low). This gives a score based on relevance of the content of the hyperlinked webpage B to the content of the webpage A that gives the link. In one embodiment, the relevance is determined by searching webpage B for words common to webpage A.

The content score may be used to lower the effect of content-based spam on the web and decaying webpages. Webpages crafted for the sole purpose of increasing the ranking of these and some affiliated pages, without improving the utility to the viewer, are called "web spam." Decaying webpages are webpages that contain old and broken hyperlinks, i.e., hyperlinks that no longer point to an existing webpage. Broken hyperlinks is an indication that a webpage is poorly maintained.

One common type of web spam is automatically generated by drawing popular words from a dictionary. Heuristic methods can be used to check the following statistics, comparing with those of normal webpages, to identify them: the number of words on the webpage and the average length of words, the amount of anchor text, the fraction of visible content, the compressibility of the webpage, the fraction of page drawn from globally popular words, the fraction of globally popular words, independent n-gram likelihoods, and the conditional n-gram likelihoods. Existing methodologies may be used for content analysis. For example, reference is made to the paper, "Detecting Spam Web Pages through Content Analysis," by Alexandros Ntoulas et al., which is incorporated herein by reference. Both spam webpages and decaying webpages have low content score.

In practice, the number in the above 3$^{rd}$ item is set close to 1 for good directory website such as Yahoo!'s while the number in the above 2$^{nd}$ item is much smaller than 1 if A has a lot of outbound links. The conductance value between a node representing a webpage and ground, which is the inverse of the resistance, can be thought of as representing the probability of users getting bored and then stopping web surfing. Ground can therefore represent the end of web surfing. The relative magnitude of the value for linear voltage controlled resistors 108a-108d is important. It is carefully calculated considering the above factors uniformly for all webpages.

A large number of weighted inbound links and an excellent content score of a webpage are translated to a large resistance between the node and the ground. The small conductance of the large resistance reflects the fact that user's energy or "potential" tends to remain high at the node. A small number of weighted inbound links and poor content score of a webpage, on the other hand, are translated to a small resistance between the node and the ground. The high conductance of the small resistance makes the node "close" to ground. In one embodiment, non-directory websites are penalized by reducing the resistance if there are too many outbound links. In practice, whether a webpage is part of a directory website can be checked manually.

To model a connection, e.g., a hyperlink, between two webpages, a diode-like device 110a-110c is used to connect the two webpage nodes in the circuit. Diode-like device 110a-110c allows energy feedback and feed-forward between the two nodes which is proportional to the potential difference between the two nodes. Real diodes in integrated circuits have the property of allowing forward current and limiting reverse current. In one embodiment, diode-like devices 110a-110c are similar.

It should be noted that web circuit 100 is passive; only passive devices are used to represent the hyperlinks. Therefore, web circuit 100 is stable. In contrast, the PageRank® system used by Google Technology, Inc. requires a teleportation number c, 0<c<1 (0.85 in practice), to make it converge. Thus, in the PageRank® system, hyperlinks would be modeled as voltage-controlled current sources.

Figure 2:
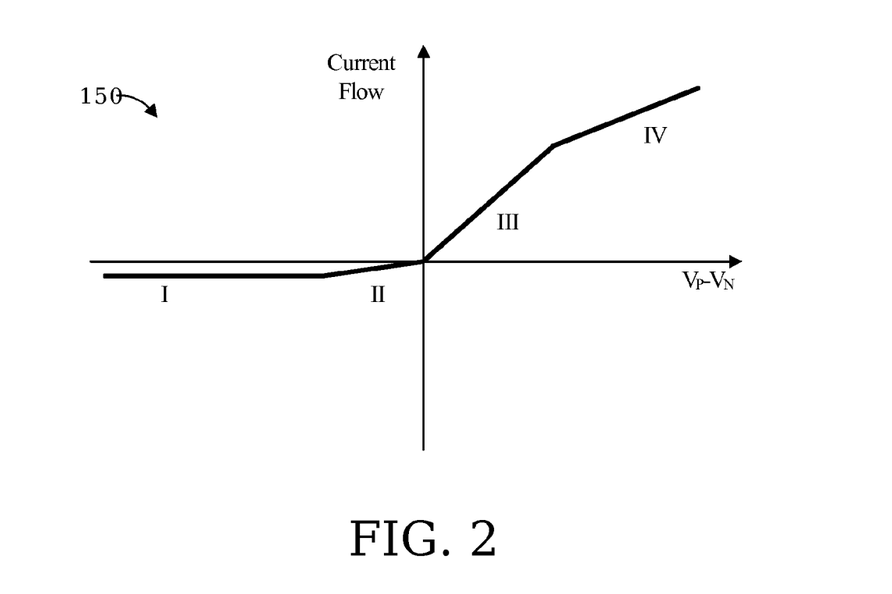
FIG. 2 shows by way of example a plot of the current flow versus the potential difference between the two nodes in the web circuit of FIG. 1.

FIG. 2 shows by way of example a plot 150 of the current flow versus the potential difference between the two nodes, P and N. The link is from P to N. If the potential at P is greater than potential at N, the conductance of the device is relatively large. If potential at P is smaller than the potential at N, the conductance of the device is relatively small. This ensures that webpages with much lower rank do not affect the rank of webpages with high rank by creating links to it. Furthermore, the rank of a webpage B with low rank is increased significantly if a webpage A with high rank creates a link to it. In addition, the rank of two webpages that are close in rank will become even closer. It should be noted that the number of B's weighted inbound links is already increased by the link from A to B. However, that effect is only related with the rank of A and some other predetermined factors, not the difference between A's rank and rank B's rank.

In one embodiment, the web circuit model limits spam webpages that may try to improve their ranking by creating a lot of links pointing to their webpages. To accomplish this goal, the diode-like devices 110a-110c may be tuned by analyzing the context of the link. For example, less importance may be given to massive links on the same page as well as advertising links. More importance may likewise be given to links that are accompanied by related content.

The diode-like devices of web circuit 100 limit the reverse and forward current flow in a nonlinear way. As represented in FIG. 2, the diode-like device are, in one embodiment, piecewise linear in 4 regions. This piecewise linearity is useful for computational efficiency. In region I, there is no conductance from node N to node P and current is fixed at a predetermined current level in the direction from N to P. In region II, there is a small amount of conductance in the direction from node N to node P. In region III, a large amount of conductance is provided in the direction from node P to node N. In region IV, a relatively large amount of conductance is provided between P and N, only slightly smaller than that in Region III.

This sophisticated nonlinear conductance model can be tuned both locally in part of the web and globally to yield desired simulation result. For example, nonlinear diode-like devices 110a-110c can be tuned to fight spam within a web domain. Specifically, for hyperlinks within the same web domain, increased rank sharing may be permitted. This is accomplished by increasing conductance in the piecewise linear regions I-IV between nodes representing the webpages within a single domain. This is reasonable for internal hyperlinks.

Designed Behaviors of the Web Model

The web circuit model is configured to have the following behavioral characteristics:

1. If a webpage has high content score and a large number of weighted inbound links, the webpage will be given a high ranking. Because the reverse energy flow in the web circuit model is limited, it does not matter whether the inbound links are from a low-ranking webpage or a high-ranking webpage.
2. If a webpage has high content score, many inbound links, and many outbound links, the webpage's rank will be affected by the rank of the webpages it links to. If it links to a low-rank webpage, it shares its own rank and lowers its rank somewhat. This feature will put pressure on webmasters to maintain its links properly.
3. Webpages identified as spam are given a low content score. Even if such a webpage has many outbound links, its own rank remain low and it does not affect other webpages' rankings.
4. If a webpage has good content score but not many inbound or outbound links, the webpage can have average or even above-average rank.
5. If a webpage has many broken links, the webpage's rank is lowered.
6. Unlike previous methods, which penalize large web domains that have a large amount of inter-linked webpages, the present method does not have this undesired property.

The web circuit model is therefore able to find webpages with great content and webpages with many weighted inbound links. In addition, the web circuit model encourages webmasters to maintain their websites and remove spam links.

With the flexibility in assigning the conductance between a node representing a webpage and the ground without any simulation or ranking stability concern, a hierarchical web search approach can be used. More specifically, one can split the root webpage of a website with deep hierarchy. A website with deep hierarchy refers to websites, such as www.microsoft.com, having many pages stemming from a root webpage, addressed with respect to the root with many levels, e.g., more than one or two levels, of hierarchy. Such a webpage may be split to two copies: a main copy and a secondary copy. The main copy inherits the position of the webpage in the web and gives a link to the secondary copy which is the only link to the secondary copy. The main copy may be indexed according to keywords that are highly relevant to the whole hierarchy of the root webpage, i.e., the root webpage and all child pages. The keywords may be determined by analyzing all of the child webpages in the hierarchy. For example, content analysis may be performed to identify key words in the child webpages. These keywords may then be removed from the secondary copy if it has any.

Figure 3A:
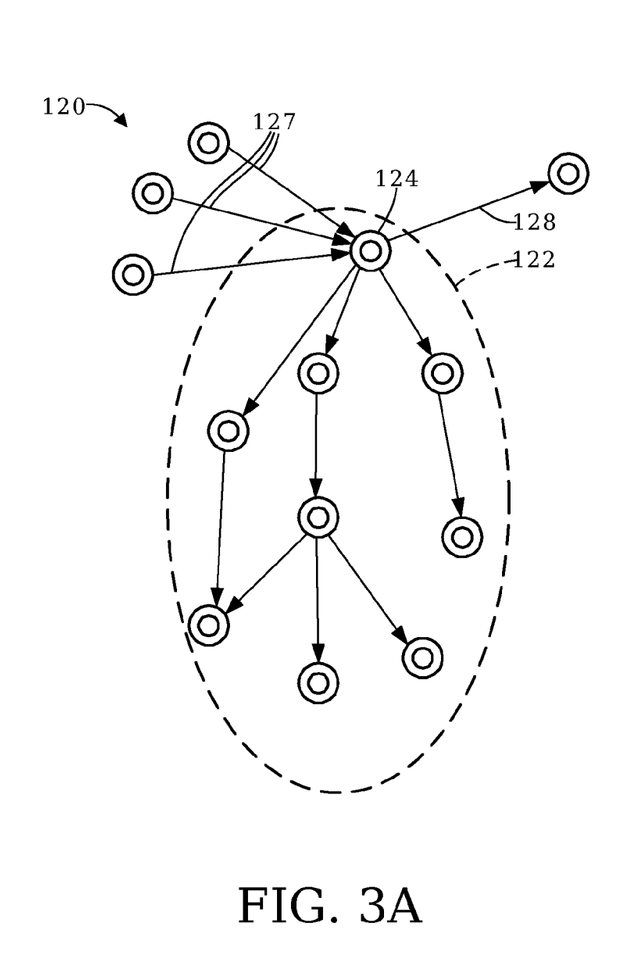
FIGS. 3A and 3B show by way of example a web circuit transformation to enhance ranking for deep hierarchical websites.
Figure 3B:
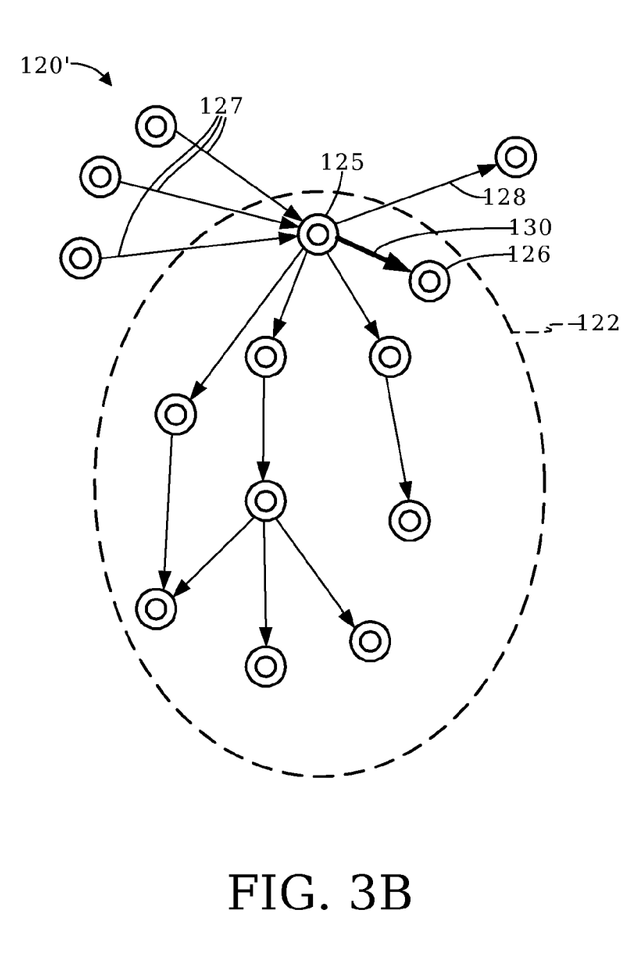

During simulation, respective nodes are created for each copy as shown by way of example in FIGS. 3A and 3B. FIG. 3A shows an initial representation 120 of a portion of the web in the form of nodes of a web circuit. For the purpose of this illustration, energy source and energy drain connections from the nodes are omitted. Each arrow can represent a hyperlink from one webpage to another webpage, or in the context of a web circuit, a diode like device connecting two nodes as described above with reference to FIG. 1. A website 122 having a deep hierarchy includes a root webpage 124 and a plurality of other webpages. Root webpage 124 includes inbound links 127 and outbound link 128. Other incoming links and outgoing links (not shown) may connect to other webpages in website 122. Thus, according to one embodiment, root webpage 124 is split into a main copy 125 and a secondary copy 126 as shown in the modified representation 120' of FIG. 3B. Main copy 125 is connected to inbound and outbound links 127, 128 so that it is positioned in the web similarly as webpage 124 in the initial representation 120 so that the node representing main copy 125 inherits the position of the original. A single link or diode-like device 130 is added from the main copy 125 to secondary webpage 126 in the modified representation 120'.

With this design, main copy 125 with its high ranking can be found easily when one searches for any of these relevant keywords because it will show up among the top of the search results due to multiple inbound links 127. Previous search methods have difficulty finding useful information in deep hierarchies because of the low ranking of the child webpages that have the useful information. On the other hand, if someone searches for keywords other than the relevant keywords, the second copy with lower ranking will be found, but it will not be among the top search results because of the lower ranking. This approach makes searching websites with deep hierarchy much more practical and useful, and will tend to lead users to the root webpage of a relevant website having a deep hierarchy. Search results that contain the relevant child webpages may be collapsed into a search result item of the root webpage to increase usefulness, allowing users to click a button to expand and review all the child webpages. In one embodiment, the user may be given an option to perform this type of search, or to search based on an initial representation as shown in FIG. 3A.

EXAMPLE

Table 1 represents an exemplary netlist for describing a web circuit having 15 nodes:

TABLE 1

```
*Web netlist
vdd 1 0 DC 5
* Models:
.MODEL dmod D rs=1000 is=1e-13
* Circuit description:
r12 1 2 1
r13 1 3 1
r14 1 4 1
r15 1 5 1
r16 1 6 1
r17 1 7 1
r18 1 8 1
```

TABLE 1-continued

```
r19 1 9 1
r110 1 10 1
r111 1 11 1
n112 1 12 1
d52 2 5 dmod
d53 3 5 dmod
d54 4 5 dmod
d56 6 5 dmod
d57 7 5 dmod
d58 8 5 dmod
d59 9 5 dmod
d512 12 5 dmod
d515 13 5 dmod
d105 5 10 dmod
d115 2 12 dmod
* For simplicity of illustration only, grounded resistors rather than
* controlled resistors are used, i.e. controlling function is constant.
rr20 2 0 1
rr30 3 0 1
rr40 4 0 1
* Resistance from weighted inbound links.
rr50 5 0 8.5
rr60 6 0 1
rr70 7 0 1
rr80 8 0 1
rr90 9 0 1
* Resistance from weighted inbound links.
rr100 10 0 2
* Resistance tuned.
rr110 11 0 3
* Resistance from weighted inbound links.
rr120 12 0 1.5
* Resistance is 1, no inbound links.
rr130 13 0 1
* Analysys:
.options numthread=2
.tran 1ns 6ns
.end
```

Table 2 shows results after solving the netlist for voltages for each node:

TABLE 2

| Node | Voltage |
|---|---|
| 1 | 5 |
| 2 | 2.5 |
| 3 | 2.5 |
| 4 | 2.5 |
| 5 | 4.47318 |
| 6 | 2.5 |
| 7 | 2.5 |
| 8 | 2.5 |
| 9 | 2.5 |
| 10 | 3.33371 |
| 11 | 3.75 |
| 12 | 3 |
| 13 | 4.57318e−12 |

As can be seen from Table 2, Node 5 has the highest score, 4.47318, because the corresponding webpage has many inbound links. Nodes 2, 3, 4, 5, 6, 7, 8, 9, and 13 have relatively low score, because they have no inbound links and a mediocre content score. It does not help for them to link to node 5. Node 11 has the $2^{nd}$ highest voltage because of grounded resistance tuning. Node 10 has the $3^{rd}$ highest score, because its content is good and it has an inbound link from node 5. Node 12 has the $4^{th}$ score, because it has an inbound link from node 2. Node 12's voltage is lower than that of node 10 because voltage of node 2 is lower than that of node 5. There is no link between the user and the webpage represented by node 13. Therefore, Node 13 has the lowest rank. This is a personalized web search and will be explained later.

The nonlinear web circuit model herein described has a lot of room for the design of a sophisticated web-ranking system. Existing techniques for analyzing integrated circuits, many of which have millions of nodes, can be used for page ranking using the present web circuit model. To efficiently solve a large non-linear system, reference is made to copending U.S. patent application Ser. No. 11/612,335, filed on Dec. 18, 2006, which is incorporated herein by reference.

Integrated Web Directory and Web Search

With the flexibility in handling directory without any simulation or ranking stability concern, an integrated web search and directory service can be provided. In one embodiment, a directory is manually created to guide a web search while web search result is used to help expanding the directory. The positive feedback between the directory and the web search can help improve each other. Thus, the integration between a web directory and a web search may be naturally built into the search process without any change to the web search user interface or user experience.

In one embodiment, an initial directory is manually created and modeled as a web circuit as part of an Internet space. In the web circuit model, the weights of the outbound links are promoted. When the web circuit model is simulated, the weighting of the outbound links result in a web directory that has substantial impact on the search result. The user still performs the same kind of search, but the search result will become more relevant as the web directory that guides our ranking behind the scene is improved and tuned.

Figure 6:
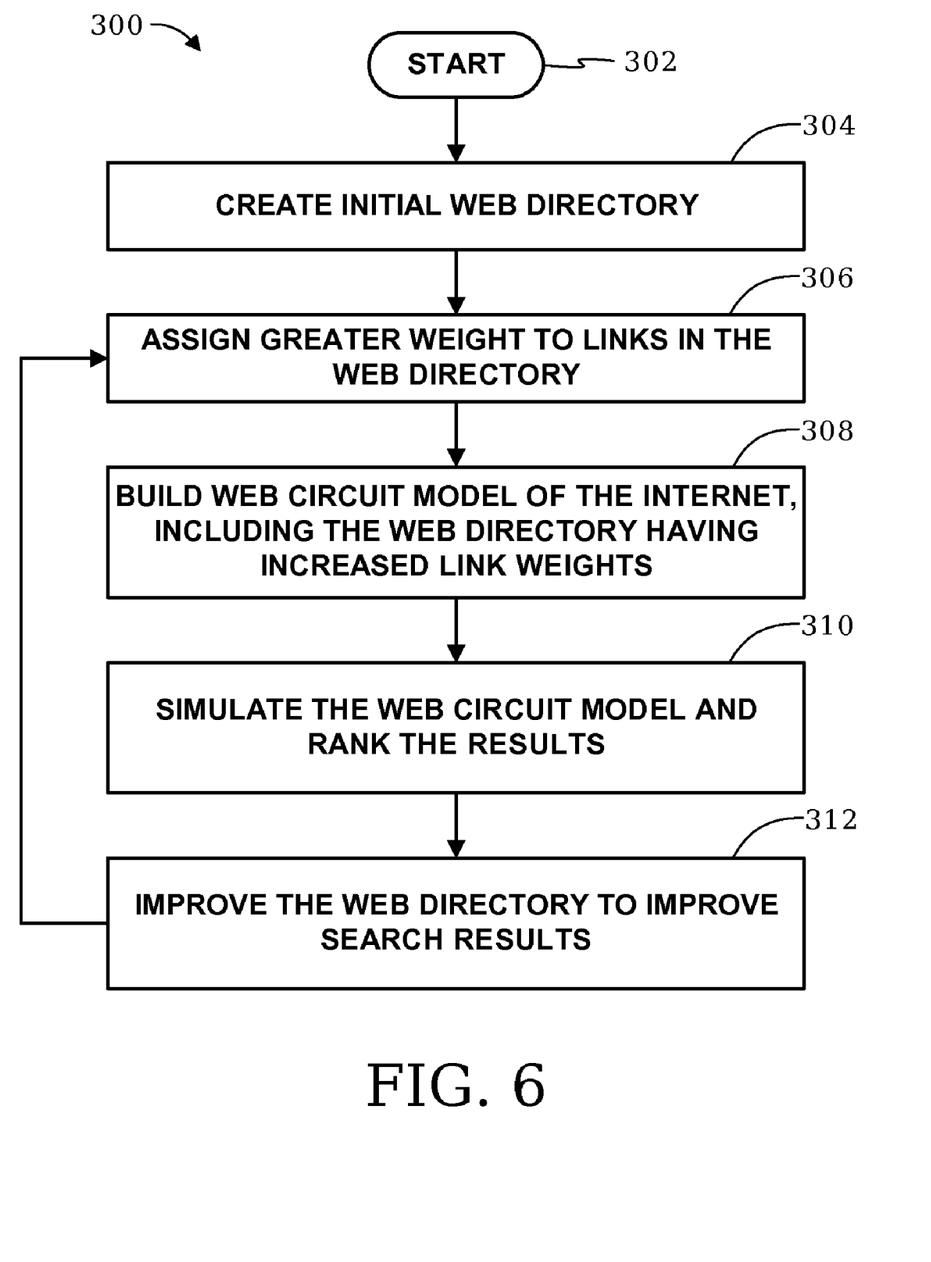
FIG. 6 shows a flowchart representing by way of example a procedure for integrating web directory and web search to improve search relevance.

FIG. 6 shows a flowchart 300 representing an exemplary procedure for integrating a directory into a web search. The procedure begins as indicated by start block 302 and flows to operation 304 wherein an initial web directory is created. The initial web directory may be generated manually or an existing web directory can be used. The initial web directory may, for example, include a plurality of webpages providing links to websites related to finance, news, travel, etc.

Once the initial web directory is created in operation 304, the procedure flows to operation 306 wherein links in the directory are assigned greater weight during a ranking process. This contrasts to existing web ranking algorithms in which the weight of each outgoing link is divided by the total number of outbound links. By not performing this division, the links are heavily weighed to provide a large boost in the resulting ranking.

Then in operation 308, a web circuit model is built as described above with reference to FIG. 1, including the web directory whose links are weighted to increase their ranking. In operation 310, the web circuit model is simulated and the webpages are ranked according to the results of the simulation as previously described.

In operation 312, the results of the simulation is used to improve the web directory, which in turn will improve the search results for a user. In one embodiment, operation 312 is a combined manual and automatic process. For example, top search results not included in the directory can be verified and added to the directory if warranted. This further enhances the web directory for future searches.

After operation 312, the procedure returns to operation 306. Thus, operations 306-312 can be repeated any number of times in an iterative manner to continually improve the integrated directory and search results.

Query-Sensitive Web Search

The web circuit model allows for query-sensitive web ranking. This is especially useful for enterprise search. The term "enterprise search" refers to a search within an intranet of an enterprise or a web domain of an enterprise. The number of webpages in an enterprise search is much smaller than that on the Internet. The number of related webpages for a user query is even more limited. As a result, an on-the-fly webpage ranking may be calculated after each query.

In one embodiment, the resistance of resistors $106a$-$106d$ may be increased between voltage node 104 and the nodes representing webpages unrelated with the query. In addition, the resistance of resistors $110a$-$110d$ between ground and the nodes representing webpages unrelated with the query may be decreased. The amount of increase and/or decrease can be tuned according to how related or unrelated they are. The relatedness can be determined using keyword analysis method as well as other well known document analysis methods. This will therefore reduce the ranking of unrelated webpages.

Alternatively, the relatedness of each webpage to the query can be incorporated into the model by modifying the content score. Webpages more related to the query can have their content score bumped up while webpages less related to the query have their content score bumped down. The result of this change will be to modify the resistance between each node representing a webpage and ground, based on relatedness. By increasing the resistance between the node and ground for highly related webpages, the webpages' rankings are increased.

For query-sensitive webpage ranking, a query-related webpage that has many inbound links from other query-related webpages will be given a high rank. For an enterprise search, user or the enterprise can be permitted to control the tuning. This will allow diverse enterprises to obtain their individual desired results using a search engine based on the web circuit model described herein.

To improve efficiency and response time in a query-sensitive web circuit simulation, a multi-rate circuit simulation approach as described in U.S. patent application Ser. No. 11/612,335 entitled "Parallel Multi-Rate Circuit Simulation," filed Dec. 18, 2006, may adopted. Unrelated webpages converge quickly to a low score and become latent. Then the latent webpages may be excluded from the simulation, which simplifies the solution.

In a non-enterprise environment, e.g., in a world-wide Internet search, a predetermined number of top pre-ranked webpages may be modeled into a web-circuit to customize the rankings of the top pre-ranked sites. For example, the top 1,000,000 webpages returned from a generic index search could be custom modeled according to the query to produce a custom query-based ranking.

Topic-Sensitive Web Search

The web circuit model also allows topic-sensitive web search. In a topic-sensitive web search, directory services that are related with a particular topic of interest to the user are identified. Outbound links of these directory services a then given a higher weight. In one embodiment, the diode-like nonlinear resistor model for the hyperlinks between these directory websites and websites in the directory is tuned so that more reverse conductance is allowed. This would have the effect of picking out the good directory services automatically in the simulation. To achieve this purpose, the conductance in the model also would be normalized according to the number of outbound links in the web directory. With this setup, the web circuit simulation will pick up the good topic-specific directories as well as the good topic-specific websites.

A topic-sensitive web search may be performed for a number of standard topics beforehand. A weighted average of the topic-specific rankings can be calculated according to user profile, which can be done at query time. User profile is defined by various interest levels corresponding to various topics and weights for the averaging are proportional to the interest levels. The user's interest levels in various topics can be set by users directly or calculated from users' past web-search history.

Interactive and Adaptive Web Search

In an interactive web ranking model, a user can query some keywords and get the first-cut web search results. Then, the user is permitted to knock off some results ranked among the top and to ask for another search. In the next search, a modified web circuit simulation is performed. In the modified web circuit, a resister with very low resistance is placed between the webpages knocked off by the user and ground. The modified web circuit simulation will be more accurate and have a better chance to return what the user really wants.

To improve efficiency and response time of the simulation for the modified web circuit, the refining step may be limited to the first 1,000,000 entries. It is assumed that nobody can browse through more than 1,000,000 entries in a normal user environment. Of course, another number of entries can be chosen depending on implementation.

In addition, the web circuit model can adapt to statistics in practical use. Webpages with a lot of clicks after searches may be promoted. The promotion can be done conveniently by increasing the resistance between the webpage node and ground.

As the amount of information and number of websites on the Internet explodes, interactive and adaptive web searches will be much likely to find useful results.

Smoothness in Ranking Variation

Abrupt changes in rankings of particular webpages may be undesirable. Such changes can be caused by changes in links to or from a webpage, or changes to the content of the webpage between visits by a web crawler. Using the sophisticated web circuit simulation method described herein, the abrupt ranking variation problem can be minimized. Specifically, a dynamic model may be used to bring more smoothness to ranking variation. In the dynamic ranking model, a grounded capacitor is linked to each node and a transient simulation of the web circuit is performed in time. The grounded capacitor brings smoothness to the variation of the potential of the node. The diode-like device 110a-110c in FIG. 1 can also be assigned a capacitance value.

In addition, a gradual change may be applied to new websites. The connection between a new website and the rest of the web may be controlled by varying the conductance in the diode-like device and its grounding resistance. A small conductance in the diode-like device and a large conductance in the grounding resistor may be used, which limit the new website's rank and therefore their impact on the ranking of other websites. Over a period of time, the conductance and resistance may be ramped up to normal values.

Hardware Simulation Acceleration

The web circuit simulation model can be assisted by hardware accelerator. A field programmable gate array (FPGA) can be used to design an application-specific system such as a sparse matrix solver. This application-specific FPGA system or application specific integrated circuit chip will speed up circuit simulation.

Exemplary Implementation in a Web Search Tool

Figure 4:
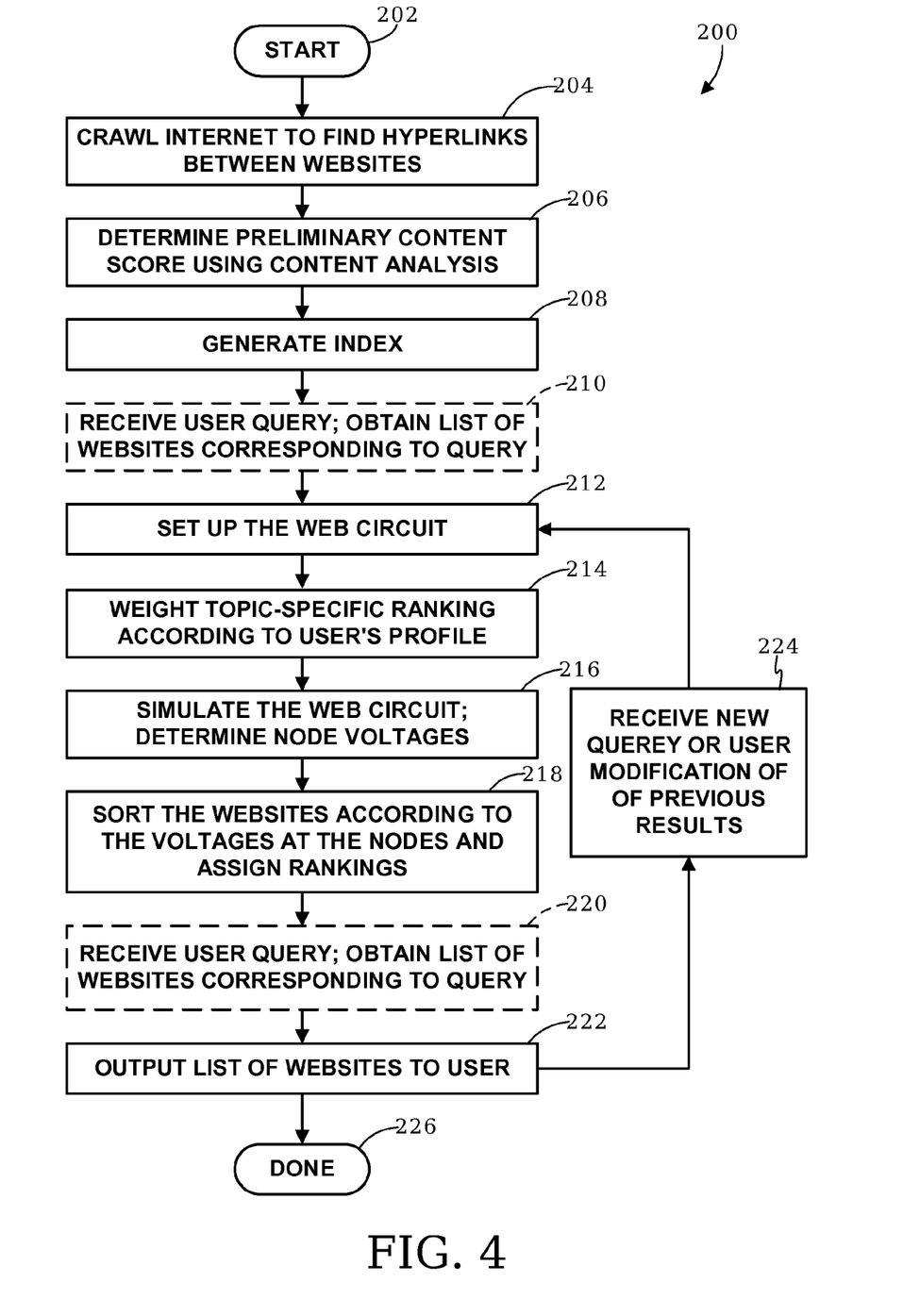
FIG. 4 shows a flowchart representing by way of example a procedure for performing a web search with ranked websites.

FIG. 4 shows a flowchart 200 representing by way of example a procedure for performing a web search with ranked webpages. The procedure begins as indicated by start block 202 and proceeds to operation 204 wherein the Internet is initially (or continually) crawled to identify webpages and hyperlinks between the webpages. Then, in operation 206, a preliminary content score is identified using content analysis. Specifically, each webpage identified in operation 204 is given a preliminary content score according to its content. The preliminary content score may be determined as described above with reference to FIG. 1.

After establishing preliminary content scores for the webpages identified in operation 204, the procedure flows to operation 208 wherein an index is generated. The index comprises a database of webpage addresses indexed by words found in the webpages. In addition, the index can include the preliminary content score for each webpage as well as other information such as the total number of outbound hyperlinks and weighted inbound hyperlinks from other webpages, as described above with reference to FIG. 1. In one embodiment, rankings can be established based on the Internet as a whole without first receiving a query.

Operation 210 is optional depending on whether the rankings will be query-sensitive or not. In the query-sensitive case, a query is obtained prior to setting up the web circuit in operation 212. To obtain a query, the user enters in a query string, e.g., one or more words or phrases relating to the information the user is looking for. When implemented by way of a webpage, the user enters the query into a text box in a web browser window. The query string is matched against webpages in the index to obtain a list of webpages related to the query string.

In operation 212, a web circuit is set up. The web circuit models the index, or a subset of the index, as a circuit as described above with reference to FIG. 1. If the rankings will be query-sensitive, the circuit is modified as described above according to how related each of the webpages retrieved from the search are to the query. In one embodiment, the webpages are pre-ranked according to a query-insensitive ranking by first performing operations 212-218, described in more detail below. Then, only the top pre-ranked webpages, e.g., the top 1,000,000 webpages according to the pre-rankings, that relate to the user's query, are retrieved and modeled in the web circuit for operation 212. This allows for an on-the-fly query-sensitive ranking of every webpage in the index, regardless as to how large the index is.

In operation 214, the diode-like devices outbound from directory services related to a topic indicated by the user or the user's profile can be adjusted as described above to provide a topic-sensitive web search.

Next, in operation 216 the web circuit is simulated to determine the potential, e.g., voltage, of each node. The circuit simulation can be performed using known circuit simulating software. Alternatively, a high performance parallel multi-rate circuit simulation method can be performed, as described in related U.S. patent application Ser. No. 11/612,335 filed Dec. 18, 2006.

After simulating the web circuit, the procedure flows to operation 218, wherein the webpages are sorted according to the potentials at their corresponding nodes. As described above with reference to FIG. 1, each webpage is assigned a corresponding node in the web circuit. The simulation will identify the potentials at each node. Nodes with higher potentials will correspond to higher quality webpages or webpages that are more likely to contain information sought by the user. The higher quality webpages are then assigned higher rankings.

Operation 220 may then be performed to obtain a user query if it was not obtained in operation 210. For instance, if the web search is implemented as non-query-sensitive, then the query can be obtained in operation 220 after modeling the Internet to obtain generic rankings. Generic rankings are rankings that are not affected by the content of a query, Once the query is obtained, only those webpages related to the query are pulled from the sorted list of webpages obtained in operation 218.

In operation 222, the sorted list of webpages related to the user's query is then generated and presented to the user. If the user is accessing the search tool by way of an Internet browser, then, the output list is formatted in HTML and transmitted to the user's browser.

If an adaptive search is implemented, the user can then modify the search results in operation 224 by knocking out undesirable results and returning to operation 212 to setup and then simulate the modified web circuit of reduced size as described above. Otherwise, the procedure ends as shown by done block 226.

Advertising System Implementation

In delivering advertisement during web search, it is important to find the words whose meaning is related with the query word in order to deliver relevant advertisements. The related words can be found by applying the simulation method described above to an online encyclopedia such as Wikipedia.

Figure 5:
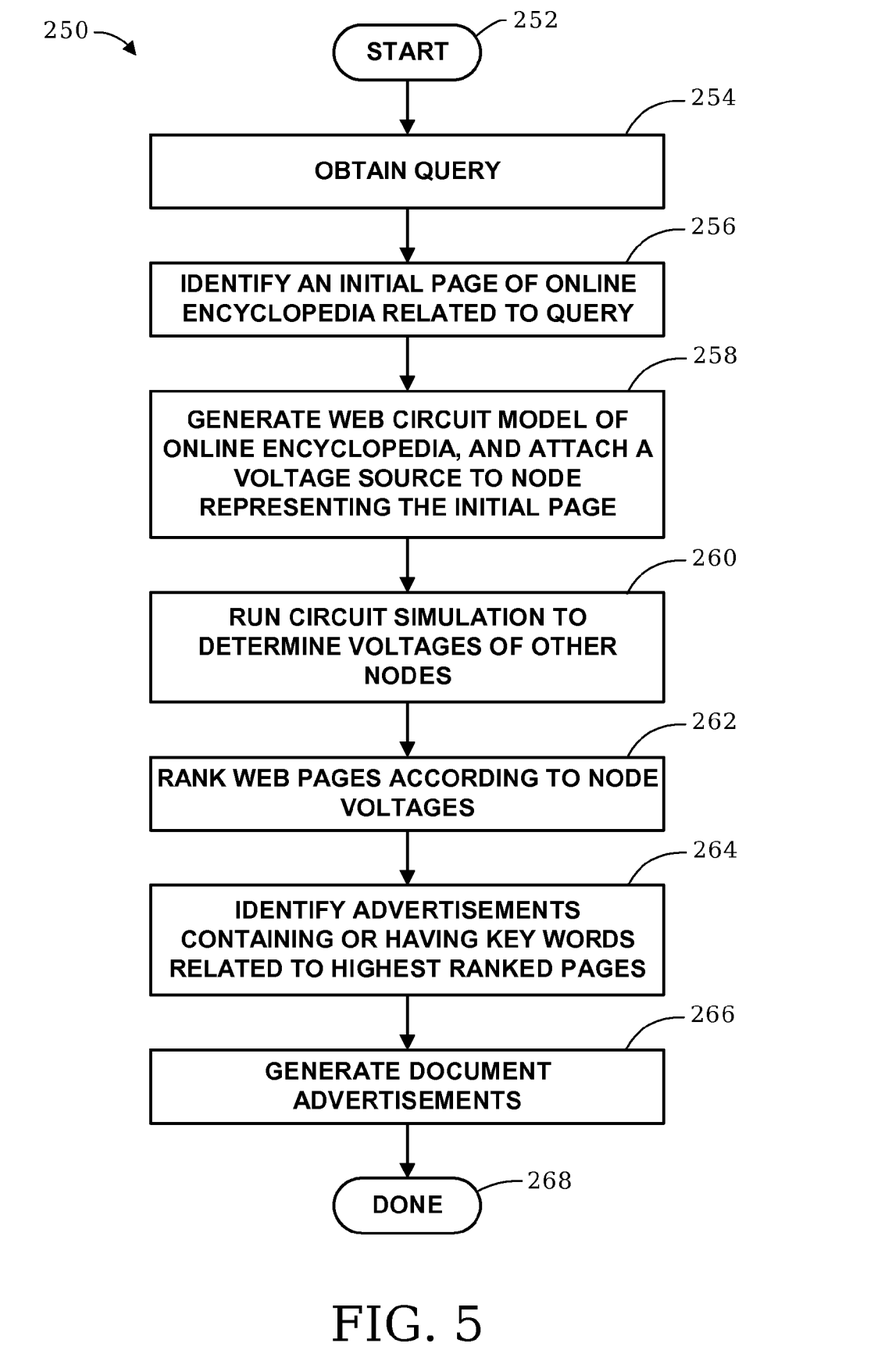
FIG. 5 shows a flowchart representing by way of example a procedure for delivering advertisement with ranked online encyclopedia webpages.

FIG. 5 shows a flowchart 250 presenting an exemplary procedure for implementing the webpage ranking system to identify words and phrases related to a query. The procedure begins as indicated by start block 252 and flows to operation 254, wherein a query is obtained. The query may be a word or a phrase.

In operation 258, the page of the online encyclopedia related to the query is identified. In one embodiment, the query is parsed to identify recognized words or phrases. Recognized words or phrases may include words and phrases for which the online encyclopedia has a dedicated webpage. If such a dedicated webpage is found, then it becomes the identified webpage. If none of the words or phrases of the query are recognized, then a closest match, e.g., a page of the encyclopedia that contains the words or phrases of the query may be identified.

In operation 260, a web circuit model of the online encyclopedia is generated. The web circuit model will include a node representing each page of the encyclopedia, with diode-like devices connecting the nodes as described above, each diode-like device representing a hyperlink connecting one of the pages of the encyclopedia to another of the pages of the encyclopedia. Furthermore, each node is connected to ground by a energy drain connection. Since all the nodes of this circuit model are from a known source, i.e., the online encyclopedia, in one embodiment, all the energy drain connections have a common resistance, which can be tuned to achieve the best result for the circuit. The node representing the identified webpage is connected to an energy source, such as a fixed voltage source.

In operation 260, the web circuit model is simulated using a computer system to calculate the expected voltages at each of the nodes. The simulation may be carried out substantially as described above, either with existing circuit simulation software or with a high performance parallel multi-rate circuit simulation method as described in related U.S. patent application Ser. No. 11/612,335 filed Dec. 18, 2006.

In operation 262, the webpages are ranked according to the voltages of the corresponding nodes, with the highest ranked webpages corresponding to the highest voltage nodes. Words or phrases having relatively high relevance to the particular query word can be found through simulating the web circuit representing the encyclopedia.

In operation 264, advertisements related to the words or phrases having high relevance are selected from a plurality of advertisements. The relatedness of the advertisement can be based on words in the advertisements themselves or key words associated with the advertisements, e.g., words selected by the persons paying for the advertisement, which may be referred to as "key words."

In operation 266, a document is generated containing the advertisements. Thus, a high voltage of a node in the web circuit model will indicate words or phrases having high relevance. Advertisements that containing or associated with these relevant words or phrases, e.g., as by keywords, may be delivered to users. After generating and delivering the document, the procedure ends as indicated by done block 268.

It should be recognized that, although an analogy is drawn between Internet webpages and an electronic integrated circuit, other analogies can be applied with equivalent results. The term, "web circuit" should therefore not be limited to an electronic circuit, but any system similar to thereto. For example, an equivalent analogy can be drawn to a piping system for pumping and circulating water, with variable resistors substituted with valves, diode-like devices substituted with check-valve-like devices, and voltage potential substituted with fluid pressure, another form of potential energy. Thus, although the analogy may be helpful in understanding the concepts and mathematics behind the non-linear system of equations described herein to model the Internet for the purpose of ranking webpages, the step of generating a netlist of an electronic circuit representing a web circuit can be skipped, and the equations can be generated directly from webpages, their content score, and other information such as weighted inbound and outbound links, as described above. The "web circuit" should therefore be understood conceptually as a system of related nodes, each node representing a webpage.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. In addition, the invention may be encoded in an electromagnetic carrier wave in which the computer code is embodied.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for ranking webpages, comprising:
   generating a web circuit model comprising a plurality of nodes, each of the nodes corresponding to a webpage;
   adding an energy source to the web circuit model;
   connecting the energy source to each of the nodes with a source connection, the source connection having a selected resistance;
   connecting each of the nodes to an energy drain with a drain connection, the drain connection having a resistance relating to a content score of the webpage corresponding to the node;
   connecting a first one of the webpages through a hyperlink to a second one of the webpages;
   for each hyperlink adding a diode function to the web circuit between a first one of the nodes and a second one of the nodes, the first one of the nodes corresponding to the first one of the webpages and the second one of the nodes corresponding to the second one of the webpages, the diode function allowing energy to flow more easily from the first node to the second node than from the second node to the first node;
   simulating the web circuit model to solve for a potential at each of the nodes, the simulating comprising entering the web circuit model into a computer and performing calculations on the web circuit model to determine the potential at each of the nodes;
   ranking the webpages according the potentials of the nodes to which the webpages correspond.

2. The method of claim 1, wherein the energy source is assigned a fixed potential.

3. The method of claim 1, further comprising:
   adjusting the resistance of the drain connection for each of the nodes corresponding to directory webpages, the resistance being a function of a value representing a quality of the directory webpages.

4. The method of claim 3 wherein the quality is determined subjectively.

5. The method of claim 1, wherein the diode functions are tuned according to context of the hyperlinks represented by the diode functions.

6. The method of claim 5, wherein a conductivity of the diode functions is decreased when the hyperlinks corresponding to the diode functions are located on a webpage with a large number of hyperlinks.

7. The method of claim 5, wherein a conductivity of the diode functions is increased when the hyperlinks corresponding to the diode functions are directed to a webpage in the same domain as the hyperlinks.

8. The method of claim 1, wherein the diode functions have a piece-wise linear potential-current curve.

9. The method of claim 1, wherein the selected resistance of the source connector is fixed so that all the source connectors have a common resistance.

10. The method of claim 1, further comprising one of decreasing the resistance of the source connector for corresponding ones of the webpages that are related to a user-submitted query or increasing the resistance of the source connector for corresponding ones of the webpages that are not related to a user-submitted query.

11. The method of claim 1, further comprising:
   identifying directory webpages related to a topic;
   assigning a high weight to outbound hyperlinks from the directory webpages;
   increasing a reverse conductance of the diode functions corresponding to the outbound hyperlinks from the directory webpages, the reverse conductance relating to how easily energy flows through the diode functions from a node representing a target of a hyperlink to a node representing a source of the hyperlink.

12. The method of claim 1, further comprising:
   creating a web directory, the web directory containing a plurality of outbound hyperlinks;
   assigning a high weight to the outbound hyperlinks;
   integrating the web directory into the web circuit model;
   performing the simulating the web circuit model; and
   improving the web directory using results of the simulation.

13. The method of claim 12, wherein the assigning, integrating, performing, and improving are performed iteratively a number of times to further enhance and improve the web directory and the rankings of the future searches.

14. The method of claim 1, further comprising:
   receiving an indication from a user that certain webpages are not desired in a results list; and
   setting the resistance of the drain connections corresponding to the certain webpages to a low value prior to performing the simulating.

15. The method of claim 1, further comprising:
   adding a grounded capacitor to each node;
   the simulating comprising, performing a transient simulation of the web circuit model.

16. A method of performing web search using a computer system, the method comprising:
   identifying webpages on a network;
   for each of the webpages, determining a content score based on a content of said each webpage;
   generating an index of the webpages, the index being a computer searchable database indexed by words found in the webpages;
   generating a web circuit model, the web circuit model comprising a node representing each of the webpages, an energy source, and a source connection corresponding to each node, each source connection connecting the energy source to one of the nodes, and a drain connection connecting each node to ground, the source connections having a selected resistance, each drain connection having a resistance relating to a content score of the webpage associated with said each drain connection, connecting two of the webpages being represented in the web circuit by a hyperlink, each hyperlink connecting two of the webpages being represented in the web circuit as a diode function having a low resistance in a direction corresponding to a direction of the hyperlink and a high resistance in a direction opposite the direction corresponding to the direction of the hyperlink;
simulating the web circuit using a computer to determine a potential at each of the nodes;
ranking the webpages according to corresponding voltages of the corresponding nodes;
sorting the webpages according to the ranking; and
producing a list of a subset of the webpages, the subset including ones of the webpages related to a query.

17. The method of claim 16, wherein the producing comprises:
formatting the list into an HTML document; and
transmitting the list to a web browser.

18. The method of claim 16, further comprising:
receiving the query from a user;
obtaining a list of webpages from the index related to the query string;
modifying the source connections so that each of the source connections has a resistance that varies with an amount of relatedness between a corresponding one of the webpages and the query string.

19. The method of claim 16, further comprising:
identifying a topic of interest to a user;
identifying ones of the webpages that are directory webpages related to the topic;
assigning a high weight to outbound hyperlinks from the directory webpages;
allowing more reverse conductance of the diode functions corresponding to the outbound hyperlinks from the directory webpages.

20. The method of claim 16, further comprising:
receiving an identification of undesirable webpages in the list of webpages;
modifying the web circuit model so that the drain connections corresponding to the undesirable webpages are given a low resistance; and
simulating the modified web circuit model, and
performing the ranking sorting and producing on the results of the simulation of the modified web circuit model.

21. The method of claim 16, wherein the generating of the web circuit model further includes adding a grounded capacitor to each node.

22. The method of claim 16, further comprising:
identifying websites having deep hierarchy;
splitting a root webpage of the website having deep hierarchy into a main copy and a secondary copy;
indexing the main copy such that the index contains key words associated with the main copy that are highly relevant to the whole hierarchy of the website having deep hierarchy;
removing from the index the key words that are highly relevant to the whole hierarchy from a list of words associated with the secondary copy; and
configuring the web circuit model so that inbound and outbound links connecting to the root webpage of the website having deep hierarchy are represented by diode functions connecting to a node representing the main copy, a diode function connecting the node representing the main copy to a node representing the secondary copy; and
child web pages in the website being represented by nodes connected by diode functions to the main copy.

23. The method of claim 22, wherein the list of the subset of the webpages including a link to the root webpage and an adjacent link, the adjacent link causing a collapsed list of links to child webpages to expand under the link to the root webpage, the child webpages being in the hierarchy of the root webpage.

24. The method of claim 16, further comprising:
creating a web directory, the web directory containing a plurality of outbound hyperlinks;
assigning a high weight to the outbound hyperlinks;
integrating the web directory into the web circuit model;
performing the simulating the web circuit model; and
improving the web directory using results of the simulation.

25. A computer-implemented method for identifying relevant advertisements from a plurality of advertisements, the method comprising:
obtaining a query;
identifying an initial page of an online encyclopedia having a plurality of pages, the initial page being related to the query;
generating a web circuit model comprising a plurality of nodes, each of the nodes corresponding to one of the pages of the online encyclopedia, the web circuit model including diode functions connected to the nodes, each diode function representing a hyperlink connecting one of the pages of the encyclopedia to another of the pages of the encyclopedia, said each diode function connecting corresponding ones of the nodes, with the diode function having a first resistance in a direction corresponding to the direction of the hyperlink and a second resistance in a direction opposite the direction of the hyperlink, the second resistance being higher than the first resistance, the web circuit model having a plurality of energy drain connections connecting each of the nodes except a node corresponding to the initial page to ground, and an energy source connected to the node corresponding to the initial page;
simulating the web circuit model to calculate a potential at each of the nodes;
ranking the pages of the online encyclopedia according to the potential at each of the nodes;
identifying the relevant advertisements related to top ranked ones of the pages, the identifying comprising identifying ones of the plurality of advertisements associated with words or phrases corresponding to the top ranked webpages; and
generating a document containing the relevant advertisements.

26. The method of claim 25, wherein the initial page of the online encyclopedia is related to a word or a phrase contained in the query.

27. The method of claim 25, wherein each of the energy drain connections has a common resistance.

28. The method of claim 25, wherein the simulating comprises running a computer program that simulates the web circuit model as though it was a design for an integrated circuit.

29. The method of claim 25, wherein the identifying of the relevant advertisements comprises comparing key words of the advertisements to the words or phrases of the top ranked webpages, the words or phrases of the top ranked webpages being words or phrases in titles of the top ranked webpages.

* * * * *